May 17, 1949.  M. F. DAVIS  2,470,474
VENDING MACHINE
Filed Jan. 2, 1947  3 Sheets-Sheet 1
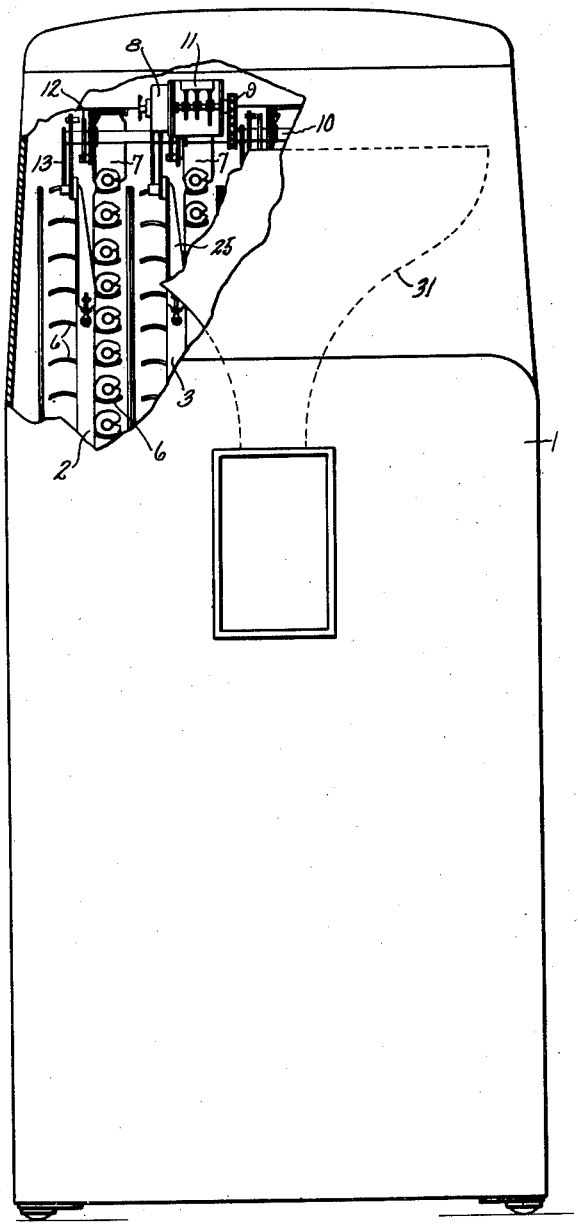
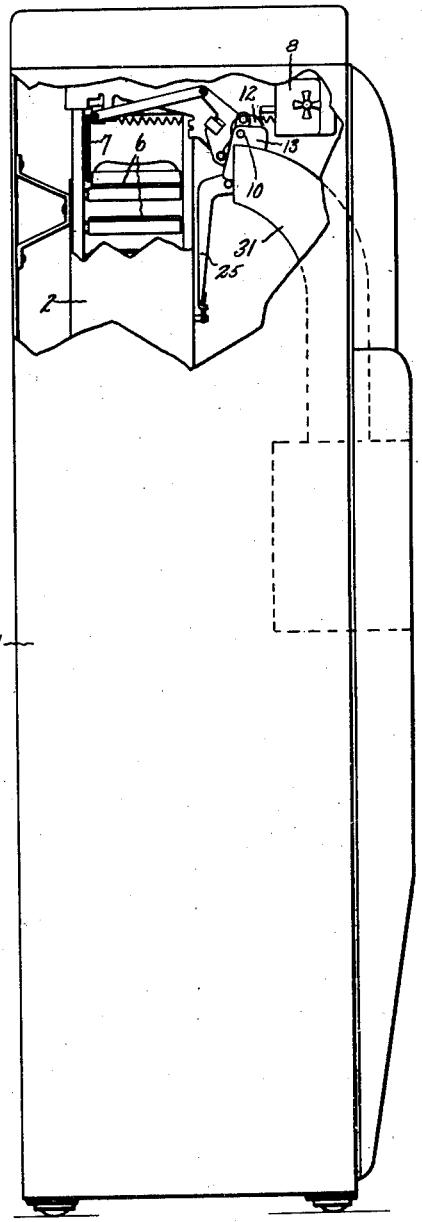
Inventor:
Maurice F. Davis,
by *Claude H. Mott*
His Attorney.

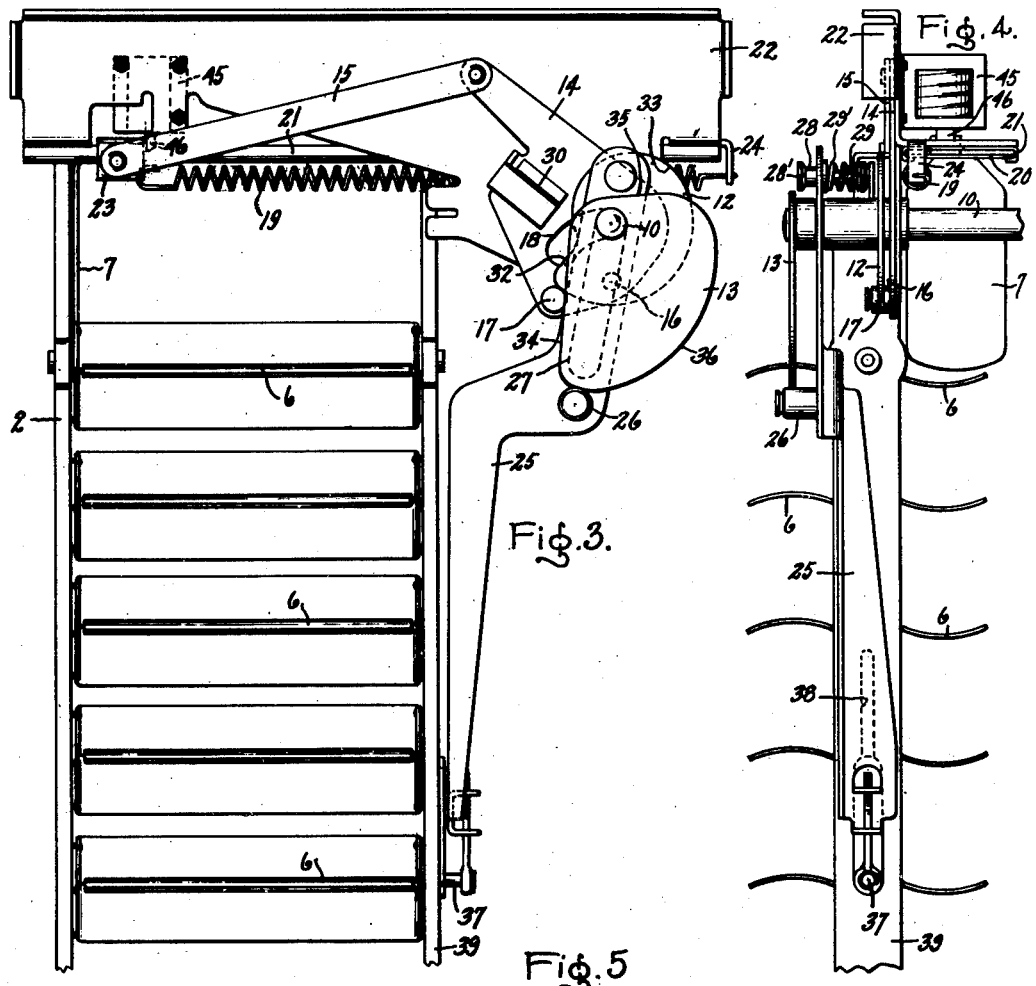
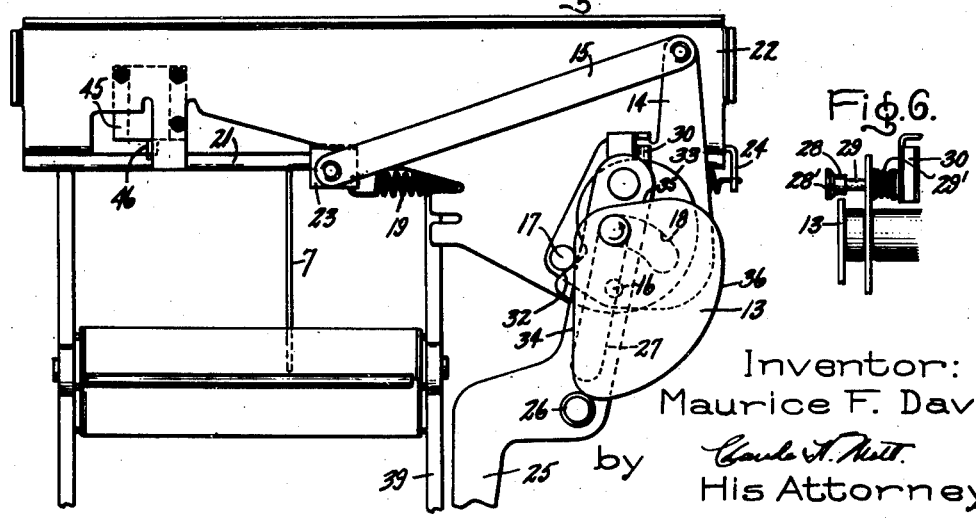

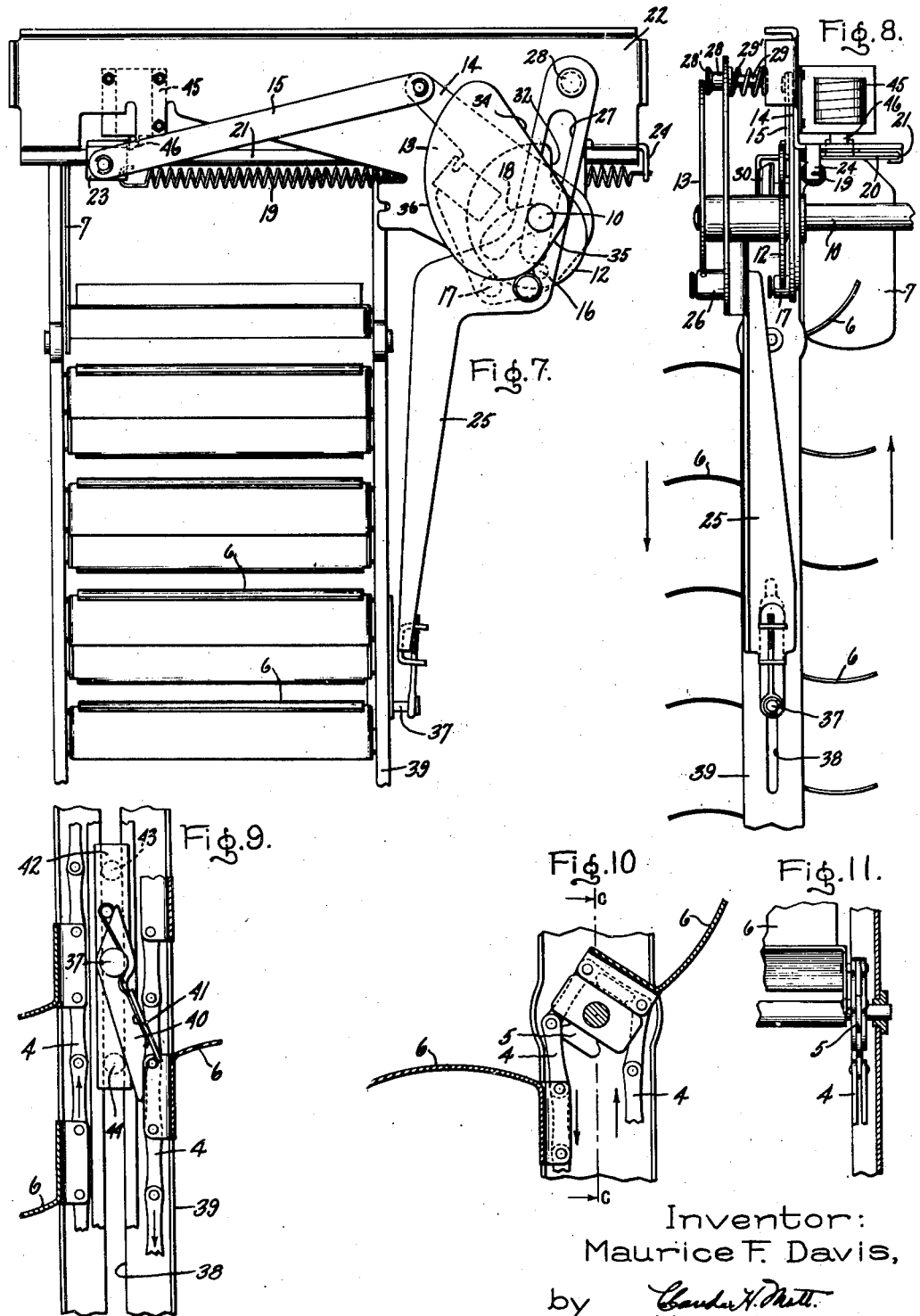

Patented May 17, 1949

2,470,474

UNITED STATES PATENT OFFICE 2,470,474

VENDING MACHINE

Maurice F. Davis, Syracuse, N. Y., assignor to General Electric Company, a corporation of New York Application January 2, 1947, Serial No. 719,749

9 Claims. (Cl. 312—92)

1

My invention relates to machines for vending various articles of commerce, such as food articles, and has for its object simple, reliable and inexpensive means for ejecting an article and thereafter moving another article into position ready to be ejected.

More particularly, my invention relates to vending machines for food articles, in which also a cooking or heating operation may be performed, of the type described and claimed in United States Patent No. 2,392,511, issued on January 8, 1946, to Ernest H. Thompson et al. In this machine sandwiches are vended and heated or cooked before being delivered. The sandwiches are placed on a plurality of endless conveyors or stacks, each stack consisting of a vertical loop chain mechanism having secured to it a plurality of vertically spaced horizontal shelves for the sandwiches. Upon the deposit of a coin, the uppermost sandwich is ejected or pushed off its shelf into a chute which delivers it to the heating apparatus. The sandwich remains in the heater for a predetermined time and then it is delivered to a receptacle from which it may be removed by the purchaser. After each sandwich is ejected, the stack is advanced.

In accordance with my invention, I provide means driven by a single motor for pushing the sandwich off its shelf, returning the pusher to its normal position, and thereafter advancing the stack to bring another sandwich into ejecting position. The motor is stopped by means of a suitable limit switch with the parts driven by it in predetermined positions.

For a more complete understanding of my invention, reference should be had to the accompanying drawing, Fig. 1 of which is a simplified front view partly broken away of a vending machine embodying my invention; Fig. 2 is a side elevation view of Fig. 1, partly broken away to shown the mechanism; Fig. 3 is an elevation view to an enlarged scale of the operating mechanism driven by the motor showing the parts in their positions when the motor is stopped; Fig. 4 is an end view of Fig. 3; Fig. 5 is a fragmentary view of the apparatus shown in Fig. 3 but showing the parts in their sandwich-ejecting position; Fig. 6 is a fragmentary end view of Fig. 5 showing details of construction; Fig. 7 is a view similar to Fig. 3 but showing the parts in their positions about midway of the ejecting and stack advancing operation; Fig. 8 is an end view of Fig. 7; while Figs. 9, 10 and 11 are views showing details of the stack and stack advancing mechanism, Fig. 11

2 being a sectional view along the line C—C of Fig. 10 looking in the direction of the arrows.

Referring to the drawing, I have shown my invention in one form as applied to a vending machine comprising an enclosing casing or support 1 in which are mounted a plurality of endless conveyors or vertical stacks, only two of which, Nos. 2 and 3, are indicated in the drawing. It will be understood a desired number of stacks may be provided for increasing the capacity of the machine or for vending a variety of articles or sandwiches. Each stack consists of a vertical loop chain structure such as disclosed in the aforesaid Thompson et al. patent, consisting of two loop chains 4 (Fig. 9) in parallel horizontal spaced relation, each chain passing over a driving and support sprocket 5 (Fig. 10). The two chains are cross connected at intervals by the horizontal supporting shelves 6 for the sandwiches.

The sandwiches in each stack are ejected or pushed off the shelves one by one by means of a reciprocable pusher 7 which pushes off the uppermost sandwich, after which the pusher is retracted and the stack advanced to bring the next sandwich into vending position. In accordance with my invention the pusher and stack are driven by means of an electric motor 8 connected through a chain 9 to a common drive shaft 10 for all of the stacks, which shaft extends horizontally across the casing just above the stacks. The motor 8 is started by means of a suitable manually operated switch, as by means of a coin operated switch (not shown) and it is stopped on completion of these operations by a suitable limit switch 11 driven by the motor, substantially as described in the Thompson et al. patent aforesaid. Each stack is provided with a duplicate mechanism driven by the shaft 10 for carrying out these operations, the particular stack from which a sandwich is to be ejected being suitably selected manually or automatically after one stack is emptied by means substantially as described in the Thompson et al. patent aforesaid.

I provide two cam means 12 and 13 secured to the shaft 10 above each stack for carrying out the ejecting and stack-advancing operations. Referring to Fig. 3, the cam 12 operates to swing an arm 14 about its stationary pivot 16 thereby to reciprocate the pusher 7 to which the arm 14 is connected by a link 15. The cam 12 bears on a roller 17 secured to the arm 14. The arm 14 is provided with an arcuate slot 18 through which extends the shaft 10. By means of a helical tension spring 19 the pusher 7 is biased toward the right hand as seen in Fig. 3 to push the sandwich off the stack. In Fig. 3 the arm 14 is held against the force of the spring 19 by means of the cam 12.

The pusher 7 is carried on a carriage 20 (Fig. 4) slidably mounted in a horizontal track 21 which, in turn, is secured to a supporting member 22, while the left hand end of the link 15 is pivotally secured to a strap member 23 secured to the carriage 20. The left hand end of the spring 19 is secured to the carriage, while its other end is secured to a projection 24 on the support 22.

Referring still to Fig. 3, the cam 13 operates a reciprocable stack advancing member 25, the cam bearing on a driving projection shown as a roller 26 secured to the member 25. The member 25 is provided with a slot 27 through which extends the shaft 10, the slot being long enough to provide for the desired amount of movement of the member 25. At its upper end the member 25 is provided with a second driving projection or roller 28 mounted on a plunger 29 which extends loosely through a hole in the member 25 and is biased by a helical spring 29' toward the right hand, as shown in Fig. 4, with the roller 28 laterally displaced out of the path of the cam 13. The roller 28 is moved toward the left hand into the path of the cam 13 by means of a cam 30 connected to the pusher. This cam is mounted on the arm 14 and when the arm 14 moves clockwise, to the position shown in Figs. 5 and 6, and the pusher to its second position to eject a sandwich, the cam 30 engages the right hand end of the plunger 29 thereby pushing the plunger and the roller 28 toward the left hand into the path of the cam 13.

When the motor 10 is started the shaft is rotated in a counterclockwise direction as seen in Fig. 3 and as indicated by the arrow. After a small angular movement the cam 12 disengages the roller 17. When the roller 17 is disengaged, the spring 19 moves the pusher 7 to the position shown in Fig. 5 whereby the uppermost sandwich is ejected into the chute 31 (Fig. 2). The cam 30 is thereby moved to a position to bring the roller 28 into the path of the cam 13. It will be observed that the cam 12 has an edge portion 32 which is substantially radial with respect to the shaft 10 so that the roller 17 is released very suddenly. Thereafter, the operating edge of the cam 12 is shaped so that its distance increases from the shaft 10 for a maximum distance from the shaft at a point 33 (Fig. 3) substantially 180 degrees from the point engaging the roller 17 as shown in Fig. 3. Therefore, as the shaft 10 continues to rotate the cam 12 moves the arm 14 and the pusher 7 back toward its first position as shown in Fig. 3 and has moved it there when the cam has turned substantially 180 degrees. The pusher 7 is now out of the way and the stack can be advanced.

During this time the cam 13 has engaged the roller 28 and in turning 180 degrees has moved upward the roller 28 and the stack-advancing member 25 to substantially its upper position. It will be observed that the roller 28 is provided with a flange 28' which engages the side of the cam 13 after the cam 30 has moved out of engagement with the plunger 29 whereby the spring 29' is prevented from moving the roller 28 toward the right. It will be understood that the cam 13 engages the roller 28 while the arm 14 is in the position of Fig. 5. As the cam 13 leaves the roller 28, however, the spring 29' moves the roller to its right hand position as shown in Fig. 4.

The cam 13, it will be observed, has two substantially straight portions 34 and 35 at substantially right angles with each other and a curved portion 36. After raising the stack advancing member 25 the cam engages the roller 26 and thereby pushes the member 25 downward whereby the stack is rotated and advanced. The lower end of the member 25 is pivotally connected to a stud 37 which, as shown in Fig. 9, extends through a vertical slot 38 in a stationary plate 39 in front of the stack. On its inner end the stud 37 carries a ratchet 40 which is biased by a spring 41 to engage successively the tops of the shelves at the points where they are secured to the chain 4. Also secured to the stud 37 is a plate 42 provided with guide pins 43 and 44 extending into the slot 38.

It will thus be observed that when the member 25 is moved upward the ratchet 40 moves upward to engage the upper end of the next shelf and when the member 25 is moved downward that side of the chain is pushed downward whereby the other side bearing the sandwiches is pushed upward to bring the uppermost sandwich into ejecting position in front of the pusher. The motor is now stopped by the limit switch 11 with the parts again in the positions shown in Fig. 3.

Fig. 7 shows the parts in their positions after the cams have been turned substantially more than 180 deg., the roller 28 having been released by the cam 13, and the member 25 having been moved downward for a substantial distance.

In the operation of a plurality of stacks I contemplate that the particular stack from which the sandwiches are to be vended will be selected as disclosed in the Thompson et al. patent aforesaid. For the purpose of holding all of the pushers 7 except the one to be operated I provide an electromagnet 45 for each mechanism. Each magnet is normally deenergized whereby a latch 46 operated by the magnet is in a downward position just in front of the carriage 23 but not engaged by the carriage. In the operation of the machine a single magnet 46 is energized for each sandwich, this magnet being the one for the selected stack and the energization of this magnet constituting the stack selection step. The latches 46 operated by the other magnets are in position to secure their pushers in their normal positions of Fig. 1 while the corresponding cams 12 and 13 for these mechanisms are turned with the shaft 10. Only a small amount of power is required to energize the magnet 45 and pick up its latch 46 by the reason of the fact that the latch 46 is not at that time holding the carriage 23, the carriage being held by the cam 13. It will be understood that the stacks not in use are not advanced by the cams 13 because of the fact that their rollers 28 are in disengaged position as shown in Fig. 4.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A vending machine comprising a reciprocably mounted pusher, a conveyor for moving a series of articles to be vended successively past said pusher, a motor, means connecting said motor to said pusher to effect movement of said pusher from a first position to a second position to eject an article from said conveyor and thereafter return said pusher to said first position, a member for advancing said conveyor to bring an article in front of said pusher, a second means movable to connect said motor to said member, and means operated by said pusher in moving to said second position for moving said second means to connect said motor to said member.

2. A vending machine comprising a reciprocably mounted pusher, a conveyor for moving a series of articles to be vended successively past said pusher, a spring for moving said pusher from a first position to a second position to push an article off said conveyor, a drive shaft, a motor connected to said drive shaft, a cam on said shaft for normally holding said pusher in said first position against the force of said spring and movable with said shaft to release said pusher for movement to eject an article from said conveyor and thereafter return said pusher to said first position, a reciprocable member for advancing said conveyor to bring an article in front of said pusher, and a second cam on said shaft for operating said reciprocable member to advance said conveyor after said pusher has been returned to said first position by said first cam.

3. A vending machine comprising a reciprocably mounted pusher, a conveyor for moving a series of articles to be vended successively past said pusher, a motor, means driven by said motor operatively connected to said pusher for effecting movement of said pusher from a first position to a second position to eject an article from said conveyor and thereafter return said pusher to said first position, a second means driven by said motor, connecting means for connecting said second means to said conveyor for movement of said conveyor to bring an article in front of said pusher, and means operated by said pusher in moving to said second position for operating said connecting means to connect said second means to said conveyor.

4. A vending machine comprising a reciprocably mounted pusher, a conveyor for moving a series of articles to be vended successively past said pusher, a motor, a first cam means driven by said motor for normally holding said pusher in a first position and movable to effect movement of said pusher to a second position to eject an article from said conveyor and thereafter return said pusher to said first position, a reciprocable member for advancing said conveyor to bring an article in front of said pusher, a second cam means driven by said motor, connecting means for connecting said second cam means to said reciprocable member for advance of said conveyor, a third cam means connected to said pusher and movable by movement of said pusher to said second position to operate said connecting means to connect said second cam means to said reciprocable member, and latching means for securing said pusher to provide for movement of said first and second cam means independently of said pusher and said conveyor.

5. A vending machine comprising a stack for a plurality of articles to be vended, said stack consisting of a vertical chain loop mechanism provided with a plurality of vertically spaced horizontal shelves for the articles, a reciprocably mounted pusher movable from a first normal position to a second position to push an article off one of said shelves, a spring for biasing said pusher to said second position, a drive shaft, a motor connected to said drive shaft, a cam on said shaft for normally holding said pusher in said first position against the force of said spring and movable with said shaft to release said pusher for movement to eject an article from said stack, said cam upon continued rotation of said shaft thereafter returning said pusher to said first position upon a predetermined rotation of said shaft, a reciprocable member for advancing said stack to bring an article in front of said pusher, and a second cam on said shaft for operating said reciprocable member so as to advance said stack after said pusher has been returned to said first position by said first cam.

6. A vending machine comprising a reciprocably mounted pusher, a conveyor for moving a series of articles to be vended successively past said pusher, a spring for moving said pusher from a first normal position to a second position to push an article off said conveyor, a driving motor, cam means driven by said motor for normally holding said pusher in said first position and movable to effect movement of said pusher by said spring to eject an article from said conveyor and thereafter return said pusher to said first position, a reciprocable member for advancing said conveyor, a ratchet connection between said member and said conveyor, a second cam means driven by said motor, a driving projection slidably mounted on said member movable laterally on said member to a position for engagement by said second cam means for movement of said member in one direction, a spring normally biasing said projection laterally out of the path of said second cam means, a third cam means connected to said pusher and movable upon movement of said pusher to its said second position for moving said projection into the path of said second cam means, means on said projection for maintaining said projection in engagement with said second cam means until said projection is disengaged by said second cam means, said second cam means being constructed and arranged to move said member in said one direction while said first cam means is returning said pusher to its said first position, and a second projection on said member engaged by said second cam means upon continued movement of said second cam means to move said member in the opposite direction to advance said conveyor.

7. A vending machine comprising a reciprocably mounted pusher, a conveyor for moving a series of articles to be vended successively past said pusher, a spring for moving said pusher from a first normal position to a second position to push an article off said conveyor, a driving motor, a first cam means driven by said motor for normally holding said pusher in said first position and movable to effect movement of said pusher by said spring to eject an article from said conveyor and thereafter return said pusher to said first position, a reciprocable member for advancing said conveyor, a ratchet connection between said member and said conveyor, a second cam means driven by said motor, a roller slidably mounted on said member movable laterally on said member to a position for engagement by said second cam means for movement of said member in one direction, a spring normally biasing said roller laterally out of the path of said second cam means, a third cam means connected to said pusher and movable upon movement of said pusher to its said second position for moving said roller into the path of said second cam means, a flange on said roller for maintaining said roller in engagement with said second cam means until said roller is disengaged by said second cam means, said second cam means being constructed and arranged to move said member in said one direction while said first cam means is returning said pusher to its said first position, a second roller on said member engaged by said second cam means upon continued movement of said second cam means to move said member in the opposite direction to advance said conveyor, and latching means for securing said pusher to provide for movement of said first and second cam means independently of said pusher and said conveyor.

8. A vending machine comprising a reciprocably mounted pusher, a conveyor for moving a series of articles to be vended successively past said pusher, a first spring for moving said pusher from a first normal position to a second position to push an article off said conveyor, a drive shaft, a motor connected to said drive shaft, a first cam on said shaft for normally holding said pusher in said first position against the force of said spring and movable with said shaft to release said pusher for movement by said spring to said second position and thereafter return said pusher to said first position upon a predetermined rotation of said shaft, an arm connecting said first cam to said pusher, a reciprocable member for advancing said conveyor, a ratchet connection between said member and said conveyor, a second cam on said shaft for moving said reciprocable member, a roller movably mounted on said member, a second spring normally biasing said roller laterally out of the path of said second cam, a third cam on said arm for moving said roller into the path of said second cam when said arm is moved with said pusher by said first spring to eject an article, a flange on said roller for maintaining said roller in engagement with said second cam until said roller is disengaged by said second cam after moving said member in one direction, and a second roller on said member engaged by said second cam upon continued movement of said second cam to move said member in the opposite direction to advance said conveyor.

9. A vending machine comprising a stack for a plurality of articles to be vended, said stack consisting of a vertical chain loop mechanism provided with a plurality of vertically spaced horizontal shelves for the articles, a reciprocably mounted pusher movable from a first normal position to a second position to eject an article from one of said shelves, a spring for biasing said pusher to said second position, a drive shaft, a motor connected to said drive shaft, a first cam on said shaft for normally holding said pusher in said first position against the force of said spring and movable with said shaft to release said pusher for movement to said second position and thereafter return said pusher to said first position upon a predetermined rotation of said shaft, an arm connecting said first cam to said pusher, a reciprocable member for advancing said stack, a ratchet connection between said member and said stack, a second cam on said shaft for moving said reciprocable member, a roller slidably mounted on said member, a spring normally biasing said roller laterally out of the path of said second cam, a third cam on said arm for moving said roller into the path of said second cam when said arm is moved with said pusher to eject an article, a flange on said roller for maintaining said roller in engagement with said second cam until said roller is disengaged by said second cam after moving said member in one direction, a second roller on said member engaged by said second cam upon continued movement of said second cam for movement of said member in the opposite direction to advance said stack, latching means for holding said pusher when said shaft and first and second cams are turned, and a magnet for moving said latching means to a position to release said pusher.

MAURICE F. DAVIS.

REFERENCES CITED

The following references are of record in the file of this patent:

UNITED STATES PATENTS

| Number | Name | Date |
| --- | --- | --- |
| 2,222,862 | Tratsch | Nov. 26, 1940 |